Feb. 21, 1967  J. PICKLES ETAL  3,305,277
ELECTRICALLY CONTROLLED HYDRAULIC BRAKE SYSTEM
Filed Dec. 28, 1964
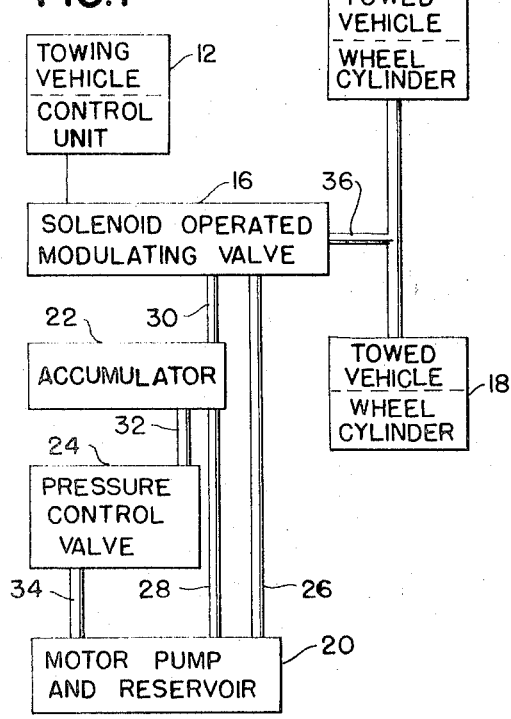
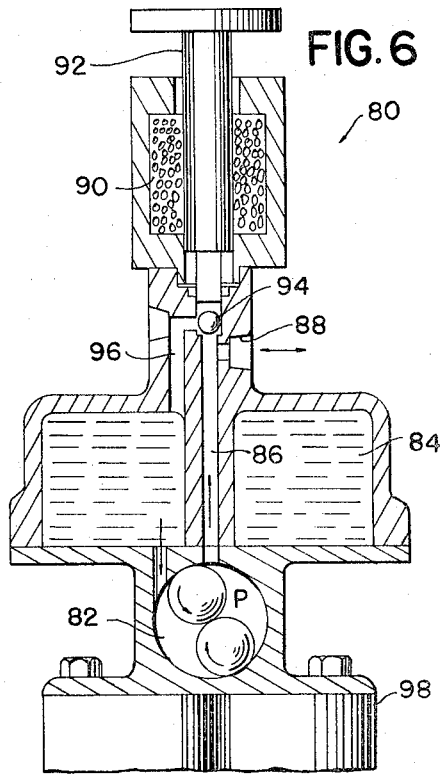
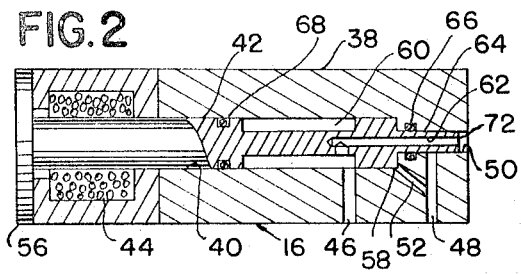
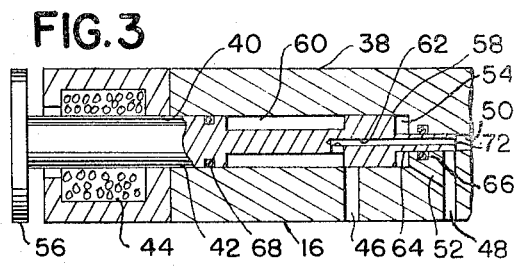
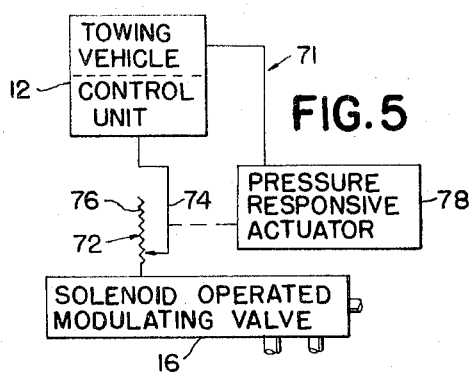
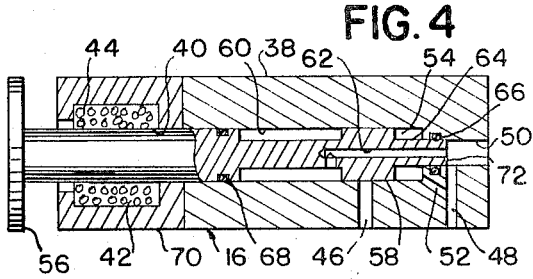
INVENTORS.
JOSEPH PICKLES
JOSEPH C. LITTMANN
BY Whittemore,
Hulbert & Belknap
ATTORNEYS United States Patent Office 3,305,277
Patented Feb. 21, 1967

3,305,277
ELECTRICALLY CONTROLLED HYDRAULIC
BRAKE SYSTEM
Joseph Pickles, Dearborn, and Joseph C. Littmann, Grosse
Pointe Woods, Mich., assignors to Ferro Manufacturing
Corporation, a corporation of Michigan
Filed Dec. 28, 1964, Ser. No. 421,349
6 Claims. (Cl. 303—20)

The invention relates to brake structure and refers more specifically to an electrically controlled hydraulic brake system for a trailer or the like.

In the past, trailers or similar towed vehicles have often not had their own brake systems. Braking of the towed vehicle has thus been difficult and very hard on the brake system of the towing vehicle since it must brake a considerably heavier load than it is normally designed for. In addition the braking of a towed vehicle by a towing vehicle places unusual stresses on the coupling between the towing and towed vehicle.

Where towed vehicles have been provided with their own brake systems in the past they have usually not been synchronized with the brake system of the towing vehicle and have often been unmodulated so that a uniform brake pressure has been applied thereby regardless of the necessity therefor. Such towed vehicle brake systems are again hard on the coupling mechanism between the towing and towed vehicles and permit no brake pressure control.

It is therefore one of the objects of the present invention to provide an improved brake system for a towed vehicle.

Another object is to provide an electrically controlled hydraulic brake system for a towed vehicle.

Another object is to provide an electrically operated hydraulic brake system for a towed vehicle including a modulating valve for metering hydraulic brake fluid to wheel cylinders of the towed vehicle in accordance with an electrical signal applied thereto.

Another object is to provide a brake system as set forth above wherein the modulating valve is a spool valve.

Another object is to provide a brake system as set forth above wherein the modulating valve is a check valve.

Another object is to provide a brake system for a towed vehicle as set forth above wherein the modulating valve is responsive to variations in pressure on the brake pedal of the towing vehicle.

Another object is to provide a brake system for a towed vehicle as set forth above wherein the modulating valve is responsive to variations in pressure applied to the towing vehicle by the towed vehicle.

Another object is to provide an electrically controlled hydraulic brake system for a towed vehicle which is simple in construction, economical to manufacture and efficient in use.

Other objects and features of the invention will become apparent as the description proceeds especially when taken in conjunction with the accompanying drawing illustrating a preferred embodiment of the invention, wherein:

FIGURE 1 is a block diagram of an electrically controlled hydraulic brake system for a towed vehicle constructed in accordance with the invention.

FIGURES 2 through 4 are longitudinal section views of the solenoid operated modulating valve of the brake system illustrated in FIGURE 1 with the valve in different operating positions.

FIGURE 5 is a partial block diagram of a modification of the brake system illustrated in FIGURE 1.

FIGURE 6 is a longitudinal section view of another modification of the brake system illustrated in FIGURES 1 through 4.

With particular reference to the figures of the drawing one embodiment of the present invention will now be considered in detail.

As shown best in FIGURE 1 the electrically controlled hydraulic brake system for towed vehicles includes a control unit 12 which may be located in a towing vehicle, means for supplying hydraulic brake fluid under pressure including accumulator 22, and a solenoid operated modulating valve 16 connected to the control unit 12 and controlling flow from the accumulator 22 for supplying hydraulic brake fluid under pressure through valve 16 and passage 36 to the wheel cylinders 18 of a towed vehicle.

In operation, the solenoid operated modulating valve 16 meters brake fluid from the accumulator 22 to the towed vehicle wheel cylinders 18 under control of an electric signal provided by the control unit 12. The modulating valve 16 may be made responsive to pressures such as the pressure on a brake pedal (not shown) in the towing vehicle or the pressure on the towing vehicle exerted by a towed vehicle.

More specifically, the control unit 12 may be, in a simple form of the invention, an on-off switch operable to connect the solenoid 44 of the solenoid operated modulating valve 16 to the usual source of electric energy (not shown) of the towing vehicle and thus energize the solenoid on depression of the brake pedal of the towing vehicle. A control unit 12 operable in this way to provide an energizing electric signal to the solenoid operated modulating valve 16 as selected times is within the skill of those in the art to provide and will not therefore be considered in detail herein.

The means for providing a supply of hydaulic brake fluid under pressure includes a motor, pump and reservoir unit 20, the controlled accumulator 22 and a pressure control valve 24. As indicated in FIGURE 1, the reservoir unit 20 is connected to an exhaust conduit 26 for returning brake fluid from the wheel cylinders 18 of the towed vehicle through the modulating valve 16 to the reservoir after the brakes of the towed vehicle have been released.

The motor, pump and reservoir unit 20 is also connected to the solenoid operated modulating valve 16 through accumulator 22 by conduits 28 and 30. Conduit 28 is connected to the pump portion of the motor, pump and reservoir unit 20 and supplies the accumulator 22 with more than enough hydraulic fluid to maintain a substantially constant pressure in the accumulator 22. The hydraulic fluid from the accumulator 22 is metered through the modulating valve 16 to the wheel cylinders 18 of the towed vehicle at a substantially constant pressure.

The accumulator 22 is connected through a pressure control valve 24 back to the reservoir portion of the motor, pump and reservoir unit 20 through bypass conduits 32 and 34. The solenoid operated modulating valve 16 is connected to the wheel cylinders 18 of the towed vehicle through the conduit 36.

The motor, pump and reservoir structure 20 are common and may be supplied by those in the art without difficulty and will not therefore be considered in detail herein. Similarly the details of the accumulator 22 and the pressure control valve 24 form no part of the present invention and will not therefore be considered herein since they may be purchased as off the shelf commercial items.

The solenoid operated modulating valve 16 as shown in FIGURES 2 through 4 includes the valve body member 38 having the cylindrical opening 40 extending longitudinally thereof in which the spool valve member 42 is mounted for axial movement on activation of the solenoid 44. The body 38 of valve 16 is provided with an intake passage 46 for hydraulic fluid under pressure to which the conduit 30 is connected. The exhaust passage 48 connected to the conduit 26 is also provided in the body 38 of the valve 16. The intake passage 46 and exhaust passage 48 serve along with the passage 50 axially aligned with the opening 40 to pass hydraulic fluid to and receive hydraulic fluid from the towed vehicle wheel cylinders 18 through conduit 36.

The passage 52 from the end of the opening 40 through the body member 38 of the valve 16 to the exhaust passage 48 is provided to permit draining of hydraulic fluid from the chamber 54 at the end of the spool valve 42 into the hydraulic fluid exhaust conduit 26.

The spool valve member 42 includes the head 56 which limits movement of the spool valve member in the opening 40 and thus prevents damage to the end 58 of the spool valve on movement of the spool valve 42 to the right as seen in FIGS. 2–4, on actuation of the solenoid 44. The spool valve member 42 is further provided with the annular recess 60 therearound in communication through passage 59 with the radially and axially extending passage 62 through the end 58 of the spool valve 42. The reduced diameter end 64 of the spool valve member 42 extends into the passage 50 in the body member 38 of the valve 16. The spool valve member 42 is sealed by convenient O-ring seals 66 and 68, in the spool and body of valve 16, respectively.

The solenoid 44 is positioned in a housing 70 which may be secured to the body member 38 of the valve 16 by convenient means not shown. As previously indicated, the solenoid 44 may be selectively connected through control unit 12 to, for example, the battery of a towing vehicle to energize the solenoid 44 whereby the spool valve member 42 will be moved initially to its innermost position as illustrated in FIGURE 2.

The operation of the solenoid operated modulating valve 16 will be considered in conjunction with the overall operation of the electrically controlled hydraulic brake system.

In operation of the brake system the wheel cylinders 18 of the towed vehicle are empty initially or have only residual hydraulic brake fluid therein. The solenoid operated modulating valve 16 is in the position illustrated in FIGURE 4, wherein the spool valve member 42 is in an outer position (to the left in the figure) so that the hydraulic fluid intake passage 46 is closed and the hydraulic fluid exhaust passage 48 is connected to the hydraulic fluid passage 50. Initially no electric signal is passed from the control unit 12 to the solenoid operated modulating valve 16 so that the solenoid 44 is not energized at this time. The motor and pump portions of the motor, pump and reservoir 20 are active only to maintain a predetermined pressure in the accumulator 22 which is regulated by the pressure control valve 24.

When the brakes of the towing vehicle are applied so that the towed vehicle should be braked also, the control unit 12 is actuated as for example by a brake pedal switch in the towing vehicle to complete a circuit through the solenoid 44 of the solenoid operated modulating valve 16. The spool valve member 42 then moves fully to the right as shown in FIGURE 2 under the influence of the energized solenoid 44 to close the exhaust passage 48 and connect the passage 50 to the intake passage 46. Brake fluid will then be supplied from accumulator 22 through conduit 30, modulating valve 16 and conduit 36 to the towed vehicle wheel cylinders 18. The brakes of the towed vehicle will thus be applied.

When the pressure of the brake fluid in the wheel cylinders 18 of the towed vehicle is a predetermined pressure, for example 300 pounds per square inch, the pressure on the end 72 of the spool valve 42 moves the spool valve 42 against the force applied by solenoid 44 into the position indicated in FIGURE 3, wherein both the intake passage 46 and the exhaust passage 48 are closed. The position of the spool valve 42 will then vary in accordance with the pressure of the brake fluid in the towed vehicle wheel cylinders 18 to maintain the predetermined pressure therein. The pressure in the towed vehicle wheel cylinders 18 required to move the spool valve 42 into the position illustrated in FIGURE 3 will be determined by the voltage applied to the solenoid 44.

When the solenoid is de-energized residual pressure in the brake system of the trailer will move the valve element 42 fully to the left as illustrated in FIGURE 4, at which time the return passage 48 is open to provide free return flow through conduit 26. At the same time the inlet passage 48 is blocked.

In the modified electrically controlled hydraulic brake system 71 illustrated in FIGURE 5, the voltage through the solenoid 44 from the control unit 12 may be varied by placing a rheostat 72 between the control unit 12 and the solenoid operated modulating valve 16. The voltage provided by the solenoid 44 is then controlled in accordance with the position of the wiper arm 74 on the resistor 76 of the potentiometer 72. The position of the wiper arm 74 may be manually varied or may be set at different fixed predetermined pressures desired to be applied to the towed vehicle wheel cylinders 18.

Alternatively a pressure responsive actuator 78 may be connected to the towing vehicle to sense, for example, the pressure applied on the brake pedal of the towing vehicle and may be connected to the wiper arm 74 of the potentiometer 72 to position it in accordance with the pressure on the brake pedal on the towing vehicle. With such a system the pressure applied to the towed vehicle wheel cylinders 18 will be in accordance with the pressure applied to the wheel cylinders of the towing vehicle. Both the brakes on the towed vehicle and the towing vehicle would thus be sensitive to the commands of the driver of the towing vehicle and little stress would be placed on the coupling between the towed and towing vehicles.

As another alternative, the pressure responsive actuator 78 may be made responsive to the pressure applied to the towing vehicle by the towed vehicle whereby the stress on the coupling between the towing vehicle and towed vehicle could be maintained at a reasonable value. Further it will be understood that the pressure responsive actuator 78 could be made responsive to both the pressure upon the towing vehicle due to the towed vehicle and the pressure on the brake pedal.

The pressure responsive actuator may of course be made responsive to some other parameter of the towing vehicle or the towed vehicle, as desired, to provide a modulated control of the electric signal provided the solenoid operated modulating valve 16.

The modified hydraulic brake system 80 illustrated in FIGURE 6 includes the substantially constant pressure pump 82 for pumping the hydraulic fluid from the brake fluid reservoir 84 through the brake fluid intake passage 86 and out of the brake fluid supply passage 88 which, as before, may be connected to the conduit 36 when the solenoid 90 is actuated to bring the solenoid armature 92 into a lower position in FIGURE 6 so that the ball check valve 94 closes the brake fluid exhaust passage 96.

Again in operation when the pressure in the towed vehicle wheel cylinders 18 is of the predetermined pressure as determined by the voltage applied to the solenoid 90, the brake fluid will unseat the check valve 94 and return brake fluid to the reservoir 84 to maintain a predetermined pressure in the towed vehicle wheel cylinders 18 as long as the solenoid 90 is energized.

When the solenoid 90 is de-energized, the hydraulic pressure in the towed vehicle wheel cylinders 18 is dissipated since the check valve 94 will be moved off of its seat by very low pressure to return brake fluid to the reservoir 84. Pump 82 as indicated in FIGURE 6 may be mounted on a motor housing 98 which houses a motor for driving the pump 82.

While one embodiment and modifications of the electrically controlled hydraulic brake system of the invention have been disclosed in detail, it will be understood that other embodiments and modifications thereof are contemplated. It is the intention to include all embodiments and modifications as are defined by the appended claims within the scope of the invention.

What we claim as our invention is:

1. An electrically controlled hydraulic brake system for applying hydraulic fluid to wheel cylinders of a towed vehicle connected to a towing vehicle comprising a source of hydraulic fluid under pressure, a solenoid operated modulating valve connected to said source of hydraulic fluid under pressure for metering the fluid to wheel cylinders of the towed vehicle on actuation thereof and a control unit for supplying an electric actuating signal to the solenoid operated modulating valve, said modulating valve including a body member having an intake passage for the hydraulic brake fluid and an exhaust passage for the hydraulic brake fluid therein, a check valve positioned between the intake passage and exhaust passage, a supply passage connected to the intake passage for metering fluid to the wheel cylinder, a solenoid and a solenoid actuated plunger operable on energization of the solenoid to urge the check valve against the intake passage and the pressure of the hydraulic fluid under pressure toward closed position.

2. A device for supplying hydraulic fluid to the hydraulic brake of a trailer at a pressure modulated in accordance with the braking action applied to a towing vehicle comprising a pump, a reservoir, a first passage connecting said reservoir to the inlet of said pump, a second passage connecting the outlet of said pump to said reservoir, a modulating valve in said second passage comprising a valve seat, a valve element movable toward and away from said valve seat to regulate pressure in said second passage between said valve and said pump, said valve element being biased toward open position by pressure in said second passage between said valve and said pump, a third passage connected to said second passage intermediate said pump and valve for connection to the trailer hydraulic brakes, a solenoid having an armature operably associated with said valve element to urge said valve element toward said seat with a force variable in accordance with energization of said solenoid, and means for applying an electric signal to said solenoid in accordance with the braking action applied to the towing vehicle.

3. A unitary hydraulic fluid supply device for use in actuating trailer brakes comprising a housing having a reservoir and pump therein, a first passage in said housing connecting said reservoir to the inlet of said pump, a second passage connecting the outlet of said pump to said reservoir, a modulating valve in said second passage comprising a valve seat, a valve element movable toward and away from said seat and movable away from said seat by pressure in said second passage intermediate said pump and said valve, a third passage connected to said second passage intermediate said pump and said valve, and said third passage being adapted to supply hydraulic fluid under a pressure modulated by said valve, a solenoid having an armature operatively associated with said valve element and adapted when said solenoid is energized to urge said valve element toward closed position with a force dependent on the electric signal applied to the windings of said solenoid, and means responsive to a braking action applied to a vehicle towing the trailer to vary the electric signal.

4. A device as defined in claim 3 in which said solenoid comprises a winding located in said housing.

5. An electrically controlled hydraulic brake system for applying hydraulic fluid to wheel cylinders of a towed vehicle connected to a towing vehicle comprising a source of hydraulic fluid under pressure, a solenoid operated modulating valve connected to said source of hydraulic fluid under pressure for metering the fluid to wheel cylinders of the towed vehicle on actuation thereof and a control unit for supplying an electric actuating signal to the solenoid operated modulating valve, said modulating valve comprising a housing having axially aligned interconnected inner and outer cylindrical chamber portions open at one end of said housing, the outer chamber portion connected at its outer end to a fluid supply passage, a fluid intake passage communicating with the inner chamber portion, a fluid exhaust passage communicating with the outer chamber portion, an elongated valve member having valve portions slidable in said chamber portions dimensioned when in intermediate position to close both of said fluid intake and exhaust passages and movable in opposite directions from intermediate position to effect gradual opening of one or the other of said last mentioned passages, a passage in said valve member extending from an intermediate portion thereof to the end of said valve member having the valve portion slidable in the outer chamber portion and communicating at its other end with the inner chamber portion, solenoid means operatively connected to said valve means and effective when energized to urge said valve member toward the position in which its valve portions open the fluid intake passage and close the fluid exhaust passage, the valve portion slidable in said outer chamber portion being subjected to fluid pressure in said fluid supply passage and being urged thereby in a direction opposite to the direction in which it is urged by said solenoid means.

6. A brake system as defined in claim 5 in which said solenoid means comprises a chamber in said housing having an opening therethrough receiving solenoid windings, the valve member extending through the solenoid chamber and having a head on its outer end limiting movement of the valve member under the influence of the solenoid means to a position in which the intake passage is fully opened by the associated valve portion of the valve member.

References Cited by the Examiner

UNITED STATES PATENTS

| 1,682,308 | 8/1928 | Schaede | 303—10 |
| 2,169,668 | 8/1938 | Thomas | 303—20 |
| 2,228,631 | 1/1941 | Kuiper | 203—20 |
| 2,374,909 | 5/1945 | Williams. | |
| 2,454,291 | 11/1948 | Pennose | 303—15 |
| 2,693,251 | 11/1954 | Hall | 303—18 |

FOREIGN PATENTS

| 946,208 | 7/1956 | Germany. |
| 520,874 | 5/1940 | Great Britain. |
| 375,938 | 10/1939 | Italy. |

EUGENE G. BOTZ, *Primary Examiner.*